United States Patent
Booten et al.

(10) Patent No.: US 10,113,010 B2
(45) Date of Patent: Oct. 30, 2018

(54) METHOD FOR ISOLATING CARBOHYDRATE ALKYLCARBAMATES

(71) Applicants: CREACHEM BVBA, Tienen (BE); DE NEEF CHEMICAL PROCESSING NV, Heist-op-den-Berg (BE)

(72) Inventors: Karl Booten, Tienen (BE); Geert Vermeulen, Ramsel (BE)

(73) Assignees: CREASEARCH BVBA, Tienen (BE); DE NEEF CHEMICAL PROCESSING NV, Heist-op-den-Berg (BE)

( * ) Notice: Subject to any disclaimer, the term of this patent is extended or adjusted under 35 U.S.C. 154(b) by 132 days.

(21) Appl. No.: 15/034,571

(22) PCT Filed: Nov. 4, 2014

(86) PCT No.: PCT/EP2014/073678
§ 371 (c)(1),
(2) Date: May 5, 2016

(87) PCT Pub. No.: WO2015/067595
PCT Pub. Date: May 14, 2015

(65) Prior Publication Data
US 2016/0311936 A1    Oct. 27, 2016

(30) Foreign Application Priority Data

Nov. 5, 2013 (BE) .................................. 2013/0749

(51) Int. Cl.
C08B 37/00 (2006.01)

(52) U.S. Cl.
CPC ................... *C08B 37/0054* (2013.01)

(58) Field of Classification Search
CPC .. C08B 37/0054; C08B 31/00; C08G 18/6484
USPC ................... 536/123.1, 32, 56, 58
See application file for complete search history.

(56) References Cited

U.S. PATENT DOCUMENTS

| | | | | |
|---|---|---|---|---|
| 5,436,078 A * | 7/1995 | Buhler | ...................... | C08L 3/04 428/474.4 |
| 2003/0125482 A1* | 7/2003 | Stevens | ................... | C08B 31/00 525/453 |
| 2011/0088711 A1 | 4/2011 | Bonafos | | |
| 2011/0091401 A1 | 4/2011 | Shah | | |

FOREIGN PATENT DOCUMENTS

| | | |
|---|---|---|
| DE | 10247696 A1 | 4/2004 |
| EP | 1086197 A1 | 3/2001 |
| EP | 1237932 A1 | 9/2002 |
| EP | 1920762 A1 | 5/2008 |
| FR | 2904766 A1 | 2/2008 |
| FR | 2927536 A1 | 8/2009 |
| FR | 2940098 A1 | 6/2010 |
| FR | 2947177 A1 | 12/2010 |
| FR | 2949058 A1 | 2/2011 |
| KR | 20060025365 A | 3/2006 |
| KR | 20060042745 A | 5/2006 |
| KR | 20090073368 A | 7/2009 |
| WO | 9964549 A1 | 12/1999 |
| WO | 2004030638 A2 | 4/2004 |
| WO | 2004030644 A1 | 4/2004 |
| WO | 2004058199 A1 | 7/2004 |
| WO | 2005026196 A2 | 3/2005 |
| WO | 2005103068 A2 | 11/2005 |
| WO | 2006121806 A1 | 11/2006 |
| WO | 2006121880 A1 | 11/2006 |
| WO | 2007051528 A1 | 5/2007 |
| WO | 2007090554 A1 | 8/2007 |
| WO | 2008017812 A1 | 2/2008 |
| WO | 2008073364 A1 | 6/2008 |
| WO | 2008138805 A1 | 11/2008 |
| WO | 2009080657 A1 | 7/2009 |
| WO | 2009080659 A2 | 7/2009 |
| WO | 2009080661 A2 | 7/2009 |
| WO | 2012000847 A2 | 1/2012 |

OTHER PUBLICATIONS

Bertsch et al., "Upper Reactions of Sucrose with N-Alkyl Isocyanates," Journal F. Prakt. Chemie., Jan. 12, 1960, pp. 108-114, vol. 11, No. 1-2.

Chauvin et al., "New Highly Regioselective Reactions of Unprotected Sucrose. Synthesis of 2-O-Acylsucroses and 2-O-(N-Alkylcarbamoyl) Sucroses," J. Org. Chem., 1993, pp. 2291-2295, vol. 58, No. 8.

Gerhardt, "Uber New Syntheses Surface-Active Sucrose Derivatives," Institute for Lipid Chemistry of the German Academy of Sciences, 1967, pp. 24-32, vol. 1966, No. 6.

Lesiak et al, "Application of Tolylene-2, 4-diisocyanate for the Syntheses of New Surface-Active Urethanes of Sucrose and Glucose," Journal F. Prakt. Chemie., 1980, pp. 877-883, vol. 322, No. 6.

Maunier et al., "Synthesis and Surface-Active Properties of Amphiphilic 6-aminocarbonyl Derivatives of D-glucose," Carbohydrate Research, 1997, pp. 49-57, vol. 299.

International Search Report from corresponding PCT Application No. PCT/EP2014/073678, dated May 6, 2015.

International Preliminary Report on Patentability from corresponding PCT Application No. PCT/EP2014/073678, dated May 10, 2016.

* cited by examiner

*Primary Examiner* — Yih-Horng Shiao
(74) *Attorney, Agent, or Firm* — Workman Nydegger

(57) ABSTRACT

The invention relates to methods for isolating carbohydrate alkylcarbamates. The invention further relates to the use of solvents for isolating a carbohydrate alkylcarbamate from a reaction mixture. The invention further relates to carbohydrate alkylcarbamate solutions in a solvent containing groups that are reactive with an isocyanate and the use of such solutions in cosmetic and pharmaceutical products, inks, coatings, paints or natural and synthetic emulsion polymers.

13 Claims, No Drawings

METHOD FOR ISOLATING CARBOHYDRATE ALKYLCARBAMATES

BACKGROUND OF THE INVENTION

Carbohydrate alkylcarbamates are applied as surface-active substances. Their preparation is disclosed in, inter alia, Maunier et al. (1997) *Carbohydrate Res.* 299, 49-57, which disclosed tensio-active properties of several 6-aminocarbonyl derivatives of methyl a-D-glucopyranoside and D-glucose and compared them with those of the 6-aminocarbonyl derivatives of the urethane named methyl 6-0-(N-heptylcarbamoyl)-a-D-glucopyranoside. Lesiak et al. (1980) *J. Prakt. Chem.* 222, 877-883, disclosed the use of 1-methyl-2,4-bis(isocyanate)benzene (commonly named tolylene-2,4-diisocyate; in short 2,4-TDI) for the synthesis of urethanes of glucose and sucrose. First 2,4-TDI was reacted with various aliphatic long chain alcohols or terpene alcohols in a molar ratio of 1:1. The reaction essentially occurred with the isocyanate group at position four, and the urethanemono-isocyanates obtained were then reacted with glucose or sucrose, respectively, to yield the corresponding di-urethanes, which presented moderate tensio-activity. The synthesis of several sucrose N-n-alkylurethanes and their tensio-active properties have been disclosed inter alia by Bertsch et al. (1960) *J. Prakt. Chem. JL*1, 108, and by Gerhardt (1967) *Abh. Dtsch. Akad. Wiss. Berlin, Kl. Chem., Geol. Biol.* 1966(6), 24-32.

The urethanes have been prepared by the reaction of sucrose with the selected n-alkyl isocyanate (H. Bertsch et al. o.c.) and by transformation of sucrose with potassium cyanate and an n-alkylhalogenide in dimethyl formamide (W. Gerhardt, o.c.).

Chauvin et al. (1993) *J. Org. Chem.* 58, 2291-2295 shows methods wherein N-alkyl sucrose carbamates are treated with N-butanol after partial removal of DMF, concentrated and purified by column chromatography.

Alkyl urethanes obtained by the reaction of n-alkyl isocyanates with fructans are disclosed in patent application EP1086197/WO9964549. These alkyl urethanes exhibit excellent surface-active properties. Surface-active substances are also obtained on the basis of the reaction of n-alkyl isocyanates with starches in EP application EP1237932A1.

In the abovementioned prior art, the synthesis and the reactivity of carbon hydrates with n-alkyl isocyanates are extensively described, as are the properties of the end products obtained as surface-active substances. In each reaction the carbohydrate is dissolved in an aprotic reaction solvent (further also called first solvent) such as, inter alia, DMF (dimethyl formamide), DMAC (dimethyl acetamide), DMSO (dimethyl sulfoxide), NMP (N-methyl-pyrrolidone) and NEP (N-ethyl-pyrrolidone), since water is not suitable in view of its own reactivity with the n-alkyl isocyanates.

However, the isolation of the carbohydrates that have reacted with the n-alkyl isocyanates to form the corresponding carbamates always takes place via a precipitation reaction, optionally preceded by partial evaporation of the reaction solvent.

For isolation and precipitation of the carbohydrate alkylcarbamates, use is made of additional solvents of the type of alcohols, ketones, ethers and esters. After precipitation, techniques such as decantation, filtration or centrifugation, followed by multiple washes with the same additional solvent, have to be used to obtain an end product containing minimal amounts of reaction solvent.

The reason for this is that carbohydrate alkylcarbamates are used in applications such as cosmetics, paints, coatings, wax emulsions, detergents, etc., in which minimal concentrations of the reaction solvents are allowed because of their toxic nature.

The abovementioned purification methods therefore have major drawbacks. In the first place, in order to achieve an acceptable quality in terms of residual reaction solvent, the quantities of additional solvent needed are large in proportion to the desired end product. The ratio of the former to the latter is at least five to ten times, and more likely twenty to thirty times. Moreover, the additional solvents used often are highly flammable and must be recovered after isolation of the carbohydrate alkylcarbamate by distillation of the reaction solvent to limit the environmental impact. In view of the large quantities of solvents to be separated, the impact on the costs of the end product is such as to render commercialisation impossible.

Moreover, no quantitative yields can be achieved with this isolation method since low-molecular carbohydrate alkylcarbamate still retain a certain solubility in the mixture of reaction and additional solvent, and as such are not co-precipitated. Typical yields of purified end product obtained range from 55 to 95%, depending on the type of carbohydrate alkylcarbamate. However, a 5% yield loss has a significant impact on the economic scalability and also means an impact on the environment because of the non-recoverability.

In the third place, it is very difficult to control the precipitation, that is to say, control of the physical shape of the precipitate obtained (granule size) is very hard and unpredictable, making it extremely difficult to use current techniques such as decantation, filtration and centrifugation, since the granule size of the precipitate determines the speed and the efficiency of these separation techniques.

For this reason, there is a need within the field for more efficient ways to remove the solvents.

SUMMARY OF THE INVENTION

A first aspect of the invention is related to methods for isolating a carbohydrate alkylcarbamate from a composition containing a solution of said carbamate with a first solvent not containing groups that are reactive with a carbohydrate, isocyanate or carbohydrate alkylcarbamate. These methods comprise the following steps:
a) adding a second solvent to the composition containing the solution of the carbohydrate alkylcarbamate, the second solvent having the following properties:
   a mixture of a first solvent, second solvent and carbohydrate alkylcarbamate forms a solution,
   a mixture of a second solvent and carbohydrate alkylcarbamate forms a solution,
   the second solvent has a boiling point that is higher than the boiling point of the first solvent, and
b) removing the first solvent from the composition obtained in step a) by applying a reduced pressure.

In certain embodiments of these methods, the second solvent is a polar solvent containing groups that are reactive with an isocyanate.

In certain embodiments of these methods, the carbohydrate alkylcarbamate is a fructan carbamate or a starch carbamate.

In certain embodiments of these methods, the first solvent is chosen from the group consisting of polar aprotic solvents, such as DMSO, DMF, DMAc, NMP and NEP, or mixtures of these.

In certain embodiments of these methods, the second solvent is an alcohol or other solvent with —OH groups.

In certain embodiments of this method, the second solvent is monopropylene glycol, 1,3-butylene glycol or glycerol.

In certain embodiments of these methods, the boiling point of the second solvent is at least 5, 10, 20, 30 or 80° C. higher than the boiling point of the first solvent.

In certain embodiments of these methods, step b) is carried out at a temperature between 80 and 150° C.

In certain embodiments of these methods, the reduced pressure is a vacuum between 20 and 0.001 mbar.

In further embodiments of the above methods, these methods further comprise the step of formulating the carbohydrate alkylcarbamate as a 10-35% (w/v) solution in second solvent, for example as a 20-25% (w/v) solution in second solvent, or for example wherein the carbohydrate alkylcarbamate is a fructan carbamate and the second solvent is glycerol.

In further embodiments of the above methods, these methods further comprise the step of using said carbohydrate alkylcarbamate solution in the preparation of a product selected from the group consisting of a cosmetic a pharmaceutical product, an ink, a coating, a paint, a natural emulsion polymers and a synthetic emulsion polymer, such as rubber.

A second aspect of the invention is related to the use of a solvent for the removal of a carbohydrate alkylcarbamate from a composition containing: 1) a solution of this carbamate and 2) a solvent not containing groups that are reactive with a sugar, isocyanate or carbohydrate alkylcarbamate, said solvent having a boiling point that is higher than the boiling point of the solvent not containing reactive groups.

In certain embodiments of this use, the solvent used for the removal contains groups that are reactive with an isocyanate.

The invention also relates to the use of a composition obtained by the methods described in the above first aspect, in cosmetic or pharmaceutical products, inks, coatings, paints or natural or synthetic emulsion polymers.

A third aspect of the invention is related to carbohydrate alkylcarbamate solutions comprising:
  at least 10 to 50% (w/v) of carbohydrate alkylcarbamate,
  50 to 90% (v/v) of solvent containing groups that are reactive with an isocyanates (especially non aqueous solvent),
  less than 5% (v/v) of polar solvent containing groups that are not reactive with an isocyanate.

In certain embodiments of these solutions, they contain 20 to 40% (w/v) of inulin carbamate and 60 to 80% (v/v) of monopropylene glycol, glycerol or 1,3-butane diol or a mixture of these.

In a specific embodiment the solution comprises between 20 to 25% (w/v) inulin carbamate and between 60-80% (v/v) glycerol.

A further aspect of this invention is related to the use of the abovementioned carbohydrate alkylcarbamate in cosmetic and pharmaceutical products, inks, coatings, paints or natural and synthetic emulsion polymers, such as rubber.

The present invention separates carbohydrate alkylcarbamates from the reaction solvent by an exchange step by distillation, preferably at reduced pressure, with an additional solvent that has a higher boiling than the reaction solvent.

This method offers the following advantages compared with the existing above-described methods:

Makes it possible to obtain very low contents of residual reaction solvent(s) in the end product without using uneconomical and unacceptably high volumes of additional solvent in relation to the end product to be obtained.

Makes it possible to prepare an end product in two steps with full recycle of the reaction solvent in pure form. Decantation, centrifugation or filtration techniques do not have to be used.

Makes it possible to work safely with low-toxic and non-flammable solvents.

Renders the production of carbohydrate alkylcarbamates economically feasible and has a low environmental impact.

Using the methods of the present invention, it is no longer necessary to purify carbohydrate carbamates via evaporation or (repeated) precipitation. There is also no need to purify the liquids used in the precipitation from residual reaction solvent.

After all, carbohydrate alkylcarbamates are used in applications such as cosmetics, paints, coatings, wax emulsions, detergents, etc., in which minimal concentrations of the reaction solvents are allowed because of their toxic nature.

The methods of the present invention make it possible to formulate the carbamate as a ready-to-use product.

DETAILED DESCRIPTION OF THE INVENTION

In the description of this invention the following terms and concepts are used:

"Carbohydrates", also called "sugars" or "saccharides", are compounds of carbon, hydrogen and oxygen atoms in which the hydrogen and oxygen atoms are present in a ratio of 2:1, their general formula being $(C_n(H_2O)_m$. Carbohydrates may consist of 1 monosaccharide unit (monosaccharides), 2 units (disaccharides), some few units (oligosaccharides) or many units (polysaccharides).

Typical "monosaccharides" are glucose and fructose.

Typical "disaccharides" are sucrose and maltose.

"Oligosaccharides" are carbohydrates composed of a small number (3-9) of monosaccharide units, such as for instance kestose, fructo-oligosaccharides, maltotriose, glucose syrups, galacto-oligosaccharides and mannane oligosaccharides.

Typical "polysaccharides" are starch, fructan and cellulose.

"Starch" is a collective name for the complex polymers of glucose and carbohydrates that serve as food reserve for plants in nature. Two main types are distinguished: amylose and amylopectin. Both types are composed of glucose molecules that are linked in a characteristic manner; a few hundreds to thousands in a regular non-branched chain in the case of amylose, a few thousands to a million in an irregularly branching tree shape in the case of amylopectin.

A "fructan" is a polymer of fructose molecules with a single saccharose molecule. They occur for instance in chicory, artichoke, asparagus, leek, unions, yacón, wheat and in some bacteria. Based on the linkage position of the fructosyl moieties to the saccharose molecule, three fructan types are distinguished:

"1-Kestose"—also called inulin: linear fructans, usually bound with $\beta(2\rightarrow1)$ glycosidic bonds.

"6-Kestose"—also called levan or phlein: linear fructans, usually bound with $\beta(2\rightarrow6)$ glycosidic linkages.

"Neokestose"—also called graminan: branched fructans bound with both $\beta(2\rightarrow1)$ and $\beta(2\rightarrow6)$ glycosidic linkages.

Cellulose is a polysaccharide consisting of a linear chain of several hundreds to a few ten thousands of β(1→4) linked D-glucose monomers.

The term "carbohydrate alkylcarbamates" indicates a group of compounds that are the result of the reaction of an alkyl isocyanate with a substrate carrying an alcoholic hydroxyl group, while the individual reaction products are called "N-alkylcarbamates", i.e. as esters of N-alkylcarbamic acid. However, the terms are often used interchangeably, also in this description.

A "fructan alkylcarbamate" or a "fructan alkylurethane", also called fructan N-alkylcarbamate (I), consists of saccharide units of the general formula (I)

A(O—CO—NH—)s  (I)

wherein A represents a fructosyl unit (F) or a terminal glucosyl unit (G) of the fructan, which is a levan or an inulin, with a degree of polymerisation (DP) of at least 3, (O—CO—NH—R) represents an N-alkylaminocarbonyloxy group, also called an alkylcarbamate group, replacing a hydroxyl group of the saccharide unit A, wherein R represents a linear or branched, saturated or unsaturated alkyl group containing 3 to 22 carbon atoms, and any mixture thereof, and wherein s represents the number of alkylcarbamate groups per saccharide unit, which is expressed as the degree of substitution (usually abbreviated DS), i.e. the average number of substituents per saccharide unit of the fructan, and which DS has a value ranging from about 0.05 to about 2.0.

The number of hydroxyl groups per saccharide unit of the fructan molecules which can be substituted by a carbamate group is at most 3 for a non-terminal, non-branched saccharide unit, whereas the number for a terminal saccharide unit and for a non-terminal branched unit is 4 and 2, respectively. Since the DS indicates an average number of substituents per saccharide unit, it is obvious that there may be saccharide units present in a fructan N-alkylcarbamate molecule which are not substituted by an alkylcarbamate group at all.

"First solvent" in the context of this invention refers to a solvent (or mixture of solvents) in which carbohydrates are fully dissolved with a solubility (expressed as gram of dissolved substance per 100 ml of solvent) of between 1 and 80%, more particularly of between 10 and 50% and preferably of between 20 and 40%. These solvents must not contain primary or secondary —OH or —NH groups that would be more reactive with the alkyl isocyanates than with the —OH groups of carbohydrates. More particularly, these solvents do not contain primary or secondary —OH or —NH groups that react with alkyl isocyanates.

A typical category of these solvents is the class of polar aprotic solvents. Polar aprotic solvents (also referred to as dipolar aprotic solvents or DAS solvents) are solvents that share the dissolving capacity for ions with the protic solvents but do not possess acid hydrogen atoms. As a rule, these solvents have a high dielectric constant and a high polarity, such as DMF (dimethyl formamide), DMAc (dimethyl acetamide), NMP (N-methyl pyrrolidone), NEP (dimethylethyl pyrrolidone), DMSO (dimethyl sulfoxide), dioxane and THF (tetrahydrofuran). Besides DAS solvents, use can also be made of other solvents, such as alpha picoline and pyrrolidine.

The boiling points of some of the abovementioned first solvents at atmospheric pressure are presented in Table I.

TABLE I

Boiling points of typical "first solvents" at atmospheric pressure

| Solvent | Boiling point |
|---|---|
| Dimethyl formamide | 153° C. |
| Dimethyl acetamide | 165° C. |
| N-methyl pyrrolidone | 202° C. |
| N-ethyl pyrrolidone | 212° C. |
| Dimethyl sulfoxide | 189° C. |

A "second solvent" in the context of this invention is a solvent (or a mixture of solvents) in which a carbohydrate alkylcarbamate is soluble at concentrations (expressed as gram of dissolved substance per 100 ml) of second solvent between 1 and 80%, more particularly of between 10 and 50% and preferably of between 20 and 40%. It is also customary for the second solvent to form a solution with the first solvent. It is also customary for the second solvent to form a solution with a solution of carbohydrate alkylcarbamate in a first solvent.

The second solvent has a higher boiling point than the boiling point of the first solvent.

The boiling point difference between a second solvent and a first solvent typically ranges between 1 and 200° C., more particularly between 50 and 200° C., and preferably between 80 and 200° C. In specific cases, the boiling point difference may be as high as 300° C. or even 400° C.

Typical examples of a second solvent are solvents with free —OH groups, such as water and alcohols, such as monopropylene glycol, 1,3-butane diol, glycerol or mixtures of these. Since all isocyanate has reacted during the reaction between carbohydrate and isocyanate, the second solvent can be added without problems.

The boiling points of some abovementioned second solvents at atmospheric pressure are presented in Table II.

TABLE II

Boiling points of typical "second solvents" at atmospheric pressure

| Solvent | Boiling point |
|---|---|
| Monopropylene glycol | 180° C. |
| 1,3-butane diol | 204-210° C. |
| Glycerol | 290° C. |

The above Tables I and II enable someone skilled in the art to choose a suitable combination of the first and second solvent to carry out the methods described here.

In a first aspect, the present invention concerns methods for isolating a carbohydrate alkylcarbamate from a composition containing a solution of this carbamate with a first solvent. This first solvent does not contain groups that are reactive with a carbohydrate, an isocyanate or a carbohydrate alkylcarbamate.

Usually, the starting product in these methods is a mixture containing only carbohydrate alkylcarbamate and first solvent (and possibly a limited amount of reagents and by-products such as residual isocyanate and its corresponding by-products (e.g. amines and/or ureides), catalyst, . . . ). However, the invention does not exclude the addition of other products before, during or after carbamate formation. Examples of such products are preservatives such as amines, sulphite or zinc oxide.

The methods of the present invention comprise the following steps:

a) In a first step, a second solvent is added to the above-mentioned composition, this solvent having the following properties:
   a mixture of second solvent and carbohydrate alkylcarbamate forms a solution, and
   the second solvent has a boiling point that is higher than the boiling point of the first solvent,
   The second solvent typically is a polar solvent.
   A mixture of first solvent, second solvent and carbohydrate alkylcarbamate usually forms a solution,
   Second solvents may contain groups that are reactive with an isocyanate. These solvents cannot be used during carbohydrate alkylcarbamate formation, but after the reaction in which all free isocyanate groups have disappeared, these solvents can be added without problem.
   Use can also be made of second solvents without groups that are reactive with an isocyanate.
b) in a second step, the first solvent is removed from the composition that is obtained in step a). This is done by applying a reduced pressure.
   In general, the applied pressure can be in a range with 900, 500, 200 or 100 mbar(a) as upper limit and 0.001 or 0.0001 mbar(a) as lower limit.
   The reduced pressure applied typically is between 500 and 0.001 mbar(a) [mbar absolute], more particularly between 100 and 0.001 mbar(a), and preferably between 20 and 0.001 mbar(a).
   During this step, the reaction mixture is heated to a temperature that is <100° C., more particularly <90° C. and preferably <80° C. This temperature is also determined by the boiling point of the first and second solvents used and by the stability of the carbohydrate alkylcarbamate.
   These methods are applicable after the preparation of carbohydrate alkylcarbamates as described in the definitions.
   Specific carbamates are fructan carbamates and are disclosed in EP1086197. These consist of saccharide units of the general formula (II)

A (O—CO—NH—R)3    (II)

wherein A is a fructosyl unit (F) or a terminal glucosyl unit (G) of the fructan, this being a levan or an inulin, with a degree of polymerisation (DP) of at least 3, (O—CO—NH—R) represents an N-alkylaminocarbonyloxy group replacing a hydroxyl group of the saccharide unit A, wherein R represents a linear or branched, saturated or unsaturated alkyl group containing 3 to 22 carbon atoms, and any mixture thereof, and s expresses the number of N-alkylaminocarbonyloxy groups per saccharide unit, which is expressed as the degree of substitution (DS), and DS has a value ranging from 0.10 to 2.0, e.g. from 0.1 to 2.0.
   In certain specific fructan carbamates, the alkyl group R is a saturated C3-C22 alkyl group or a mixture of the alkyl groups.
   In certain specific fructan carbamates, the alkyl group R is a monounsaturated C3-C22 alkyl group or a mixture of the unsaturated alkyl groups.
   In certain specific fructan carbamates, the alkyl group R is a linear or branched C6-C18 alkyl group or a mixture thereof.
   The degree of substitution (DS) may have a value ranging from 0.15 to 1.5 or from 0.1 to 2.0.
   A specific group of fructan carbamates are those in which the fructan is an inulin.
   A more specific group of fructan carbamates are those in which the fructan is a polydisperse linear or slightly branched inulin or a mixture thereof, with a degree of polymerisation (DP) ranging from 3 to 100, or ranging from 6 to 40.
   A more specific group of fructan carbamates are those in which the inulin is an oligofructose with a DP<10.
   Carbohydrate alkylcarbamates are also known from EP 1967530. The substituted polymeric saccharides here have a general formula (III)

SAC(—M)s    (III)

wherein:
"SAC" (i) is an inulin group with a degree of polymerisation between 3 and 100, or (ii) is a starch group with a dextrose equivalent (D.E.) value between 2 and 47;
(—M) is a hydrophobic group substituting at least a hydrogen of "SAC", (—M) being chosen from the group consisting of:
an alkylcarbamoyl radical of formula R1-NH—O—, an alkenyl-carbamoyl radical of formula R2-NH—CO—, an alkylcarbonyl radical of formula RLCO—, an alkenylcarbonyl radical of formula R2-CO—, an alkyl radical of formula RL, an alkenyl radical of formula R2-, and a hydroxyalkyl radical of formula R3-,
wherein:
R1 represents a linear or branched alkyl group with 4 to 22 carbon atoms, R2 represents a linear or branched alkenyl group with 4 to 22 carbon atoms, R3 represents linear or branched hydroxyalkyl group with 4-22 carbon atoms of formula —CHR'—CHOH—R", wherein R' is hydrogen or a linear or branched alkyl group with 2 to 20 carbon atoms, and R" is a linear or branched alkyl group with 2 to 20 carbon atoms;
"S" is the number of hydrophobic moieties (—M) attached to SAC, expressed as the number-average degree of substitution (av. DS) per individual fructosyl and/or glucosyl unit, with a value between 0.01-2.0.
   Here, SAC may be an inulin group, for instance derived from inulin from chicory with a degree of polymerisation (DP) between 3 and 70, preferably between 20 and 30.
   SAC may also be a starch hydrolysate group, for instance derived from a starch hydrolysate with a glucose equivalent (DE) value ranging from 2 to 20, or between 20 and 47.
   In specific molecules, the hydrophobic group in formula (III) is an alkyl carbamoyl group of formula R1-NH—CO— or an alkenyl carbamoyl group R2-NH—CO—, wherein R is a linear or branched alkyl group with 4-22 carbon atoms and R2 a linear or branched alkenyl group with 4-22 carbon atoms.
   In specific molecules, the hydrophobic group in formula (III) is an alkylcarbonyl radical of formula R1-CO— or an alkenyl-carbonyl group of formula R2-CO—, wherein R1 is a linear or branched alkyl group with 4-22 carbon atoms is and R2 is a linear or branched alkenyl group with 4-22 carbon atoms.
   In specific molecules, the hydrophobic group in formula (III) is an alkyl group of formula R1 hydroxyalkyl or a group of formula R3-, wherein R1 represents a linear or branched alkyl group with 4-22 carbon atoms and R3 a linear or branched hydroxyalkyl group with 4-22 carbon atoms of formula —CHR'—CHOH—R", where R' is hydrogen or a linear or branched alkyl group and R" is a linear or branched alkyl group.
   In specific molecules, SAC is an inulin group with an average degree of polymerisation (av. DP) of 20 to 27 and the hydrophobic group is an alkyl-carbamoyl group of formula R1-NH—CO— or a group of formula alkenyl carbamoyl R2-NH—CO—, wherein R1 is a linear or branched alkyl group with 6 to 18 carbon atoms and R2 a linear or branched alkenyl group with 6 to 18 carbon atoms.

In specific molecules, SAC is a starch hydrolysate group with a DE value of 2 to 20 and the hydrophobic moiety is an alkylcarbamoyl group of formula R1-NH CO— or an alkenyl carbamoyl group of formula R2-NH—CO—, where R1 is a linear or branched alkyl group with 6 to 18 carbon atoms and R2 a linear or branched alkenyl group with 6 to 18 carbon atoms.

In specific molecules, SAC is an inulin group and the hydrophobic moiety is an alkylcarbonyl radical of formula R1-CO— or an alkenyl-carbonyl group of formula R2-CO—, wherein R1 is a linear or branched alkyl group with 4 to 22 carbon atoms, and R2 a linear or branched alkenyl group with 4-22 carbon atoms.

In specific molecules, SAC is an inulin group and the hydrophobic group is an alkyl group of formula R1-, wherein R1 is a linear or branched alkyl group with 4 to 22 carbon atoms, or a hydroxyalkyl group of formula R3-, wherein R3 is a linear or branched hydroxyalkyl group with 4-22 carbon atoms.

In specific molecules, the component has a number-average degree of substitution (av. DS) between 0.02 and 1.0 or between 0.05 and 0.5.

Examples of first solvents used during the synthesis of carbohydrate alkylcarbamate include polar aprotic solvents such as DMSO, DMF, DMAc, NMP and NEP or mixtures of these.

Examples of second solvents that are added are alcohols or other solvents with —OH groups, such as monopropylene glycol, 1,3-butylene glycol and glycerol.

Depending on the embodiment, the boiling point of the second solvent for instance is at least 1° C. and more particularly 50° C., and preferably 80° C. higher than the boiling point of the first solvent.

In typical applications, a carbohydrate carbamate is present after formation in a concentration of from 1 to 60%. The quantity of second solvent usually is a single- to ten-fold excess and more particularly a single- to five-fold excess, and preferably a single- to three-fold excess.

Distillation is a technique for separating two or more liquids by evaporation on the basis of a difference in boiling point. Since evaporation of the substance with the lower boiling point will be somewhat higher, enrichment will take place relative to the original composition. By repeating such evaporation and condensation, it is possible to eventually obtain the lower-boiling liquid as a pure liquid. The classical distillation may take place both in a continuous process and in a batch process.

Thin-film distillation is a technique in which a solvent mixture is uniformly evaporated over the inside of the tube via a scraping system. With this technique, highly loaded mixtures (e.g. salts, polymers, . . . ) can be purified in a continuous manner, with a distillate mixture being obtained as overhead product and a residue/paste as bottom product.

Short-path distillation is comparable to thin-film distillation, but in this case the cooler is integrated into the heating tube so that the pressure losses are very low and it is possible for the purification to take place at a pressure of <0.001 mbar(a). As a result, very high-boiling or temperature-sensitive molecules can still be purified.

A second aspect of the invention is related to the use of a solvent containing groups that are or are not reactive with an isocyanate for the removal of a carbohydrate alkylcarbamate from a composition containing: 1) a solution of this carbamate and 2) a solvent not containing groups that are reactive with a sugar, isocyanate or carbohydrate alkylcarbamate, the solvent with reactive groups having a boiling point that is higher than the boiling point of the solvent not containing reactive groups.

Another aspect of the invention is related to carbohydrate alkylcarbamate solutions comprising:
a) at least 5, at least 10, at least 25, at least 50% (w/v) of carbohydrate alkylcarbamate,
b) 50 to 90% (v/v) of solvent containing groups that are reactive with an isocyanate,
c) less than 5%, 3%, 1% (v/v) of polar solvent not containing groups that are reactive with an isocyanate.

In specific embodiments, the sum of a, b and c is 100%. In other embodiments, the sum of a, b and c is between 99 and 100%, between 95 and 100%, between 80 and 90%, or between 70 and 80%.

The composition of a specific example of such a solution is for instance:
20 to 40% (w/v) of inulin carbamate,
60 to 80% (v/v) of monopropylene glycol, glycerol or 1,3-butane diol or a mixture of these.

The presence of a solvent such as DMAc and DMF is to be prevented in e.g. cosmetic applications.

Concentrated solutions of a carbohydrate alkylcarbamate in a solvent with groups that are reactive with an isocyanate, such as glycerol, have hitherto not been disclosed. Such solutions are compatible with e.g. cosmetic applications and can directly be included in a product formulation.

Carbohydrate alkylcarbamates, as prepared in this invention, find their application in cosmetic products as disclosed inter alia in patent publications WO04030638, WO04030644, DE10247696, WO04058199, WO08/017812, FR2904766, WO07051528 and WO06121806. WO06121880, KR2006025365, KR2006042745, WO05026196, WO05103068, WO08138805, WO09080657, WO09080661, WO08073364, EP1920762, WO07090554, FR2927536, FR2940098, FR2947177, FR2949058, U.S. 2011088711, U.S. 2011091401, KR20090073368, WO09080659 and WO120847. The compositions disclosed in these publications are cited as non-limiting examples. Some components may be left out or replaced, or their concentration may be raised or lowered. Other ingredients, known in the art, may be added.

The solutions are furthermore used in pharmaceutical products, inks, coatings and paints, natural and synthetic emulsion polymers, such as natural rubber. In these applications, they serve as emulsion stabiliser, dispersion stabiliser foaming agent, foam stabiliser, liposome stabiliser, dispersant or wetting agent.

Inulin carbamates are used, inter alia, in natural rubber latex to inhibit coagulation and degradation.

EXAMPLES

Example 1

500 g of dried inulin (less than 0.2% residual moisture content) (Orafti HP, BENEO Orafti) is dissolved at 70° C. in 1500 g of dry DMF (dimethyl formamide). 255 g of N-octylisocyanate is added under stirring and kept at 80° C. for 6 hours.

Then, 3100 g of 1,3-butane glycol is added to the reaction mixture, followed by mixing until a homogeneous mixture is obtained. This mixture is subsequently pumped over a scraped film distillator.

At a working pressure of 3 mbar and a temperature of 100° C., a mixture of DMF and 1,3-butane diol is distilled off so that the residual DMF content of the carbohydrate carbamate fraction amounts to 420 ppm.

The carbohydrate carbamate yield is higher than 99.5%.

Example 2

500 g of dried inulin (less than 0.2% residual moisture content) (Orafti HP, BENEO Orafti) is dissolved at 70° C. in 750 g of dry DMSO.

71.5 g of N-dodecyl isocyanate is added under stirring and kept at 80° C. for 6 hours.

Then, 1945 g of glycerol is added to the reaction mixture followed by mixing until a homogeneous mixture is obtained. This mixture is subsequently pumped over a scraped film distillator.

At a working pressure of 3 mbar and a temperature of 135° C., a mixture of DMSO and glycerol is distilled off so that the residual DMSO content of the carbohydrate carbamate fraction amounts to 320 ppm.

The carbohydrate carbamate yield is higher than 99.5%.

Example 3

500 g of dried inulin (less than 0.2% residual moisture content) (Orafti HP, BENEO Orafti) is dissolved at 70° C. in 750 g of dry DMSO.

71.5 g of N-dodecyl isocyanate is added under stirring and kept at 80° C. for 6 hours.

Then, 1945 g of glycerol is added to the reaction mixture followed by mixing until a homogeneous mixture is obtained. This mixture is subsequently pumped over a scraped film distillator.

At a working pressure of 1 mbar and a temperature of 122.5° C., a mixture of DMSO and glycerol is distilled off so that the residual DMSO content of the carbohydrate carbamate fraction amounts to 72 ppm.

The carbohydrate carbamate yield is higher than 99.5%.

The invention claimed is:

1. A method for isolating a carbohydrate alkylcarbamate from a composition containing a solution of said alkylcarbamate dissolved in a first solvent which does not contain groups that are reactive with a carbohydrate, isocyanate or carbohydrate alkylcarbamate or for preparing a product comprising the carbohydrate alkylcarbamate, the method comprising the following steps:
   a) adding a second solvent to the composition containing the solution of the carbohydrate alkylcarbamate, the second solvent having the following properties:
      the second solvent forms a solution with a mixture of the first solvent and carbohydrate alkylcarbamate, the second solvent forms a solution with the carbohydrate alkylcarbamate, and the second solvent has a boiling point that is at least 5° C. higher than the boiling point of the first solvent, wherein the first solvent is a polar solvent, and
   b) removing the first solvent in a removing step, the removing step consisting of removing the first solvent from the composition obtained in step a) by applying a reduced pressure, the resulting composition containing less than 5% (v/v) of the first solvent.

2. The method according to claim 1, wherein said second solvent is a polar solvent containing groups that are reactive with an isocyanate.

3. The method according to claim 1, wherein said carbohydrate alkylcarbamate is a fructan carbamate or a starch carbamate.

4. The method according to claim 1, wherein said first solvent is a polar aprotic solvent chosen from the group consisting of DMF (dimethyl formamide), DMAC (dimethyl acetamide), DMSO (dimethyl sulfoxide), NMP (N-methyl-pyrrolidone) and NEP (N-ethyl-pyrrolidone), and mixtures thereof.

5. The method according to claim 1, wherein said second solvent is an alcohol or other solvent with —OH groups.

6. The method according to claim 1, wherein said second solvent is chosen from the group consisting of monopropylene glycol, 1,3-butylene glycol and glycerol.

7. The method according to claim 1, wherein said boiling point of the second solvent is at least 10, 20, 30 or 80° C. higher than said boiling point of the first solvent.

8. The method according to claim 1, wherein step b) is carried out at a temperature between 80 and 150° C.

9. The method according to claim 1, wherein said reduced pressure is a vacuum between 20 and 0.001 mbar.

10. The method according to claim 1, further comprising a step c) of formulating the carbohydrate alkylcarbamate as a 10-35% (w/v) solution in said second solvent.

11. The method according to claim 10, wherein said carbohydrate alkylcarbamate is formulated as a 20-25% (w/v) solution in said second solvent.

12. The method according to claim 11, wherein said carbohydrate alkylcarbamate is a fructan carbamate and said second solvent is glycerol.

13. The method according to claim 10, further comprising the step of using said carbohydrate alkylcarbamate solution in the preparation of the product selected from the group consisting of a cosmetic product, a pharmaceutical product, an ink, a coating, a paint, and a synthetic emulsion polymer.

* * * * *